United States Patent
Yang

(10) Patent No.: US 10,735,952 B2
(45) Date of Patent: Aug. 4, 2020

(54) NODE AND METHOD FOR MANAGING A PACKET DATA NETWORK CONNECTION

(71) Applicant: Telefonaktiebolaget LM Ericsson (publ), Stockholm (SE)

(72) Inventor: Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 161 days.

(21) Appl. No.: 15/746,045

(22) PCT Filed: Jun. 22, 2016

(86) PCT No.: PCT/EP2016/064395
§ 371 (c)(1),
(2) Date: Jan. 19, 2018

(87) PCT Pub. No.: WO2017/029000
PCT Pub. Date: Feb. 23, 2017

(65) Prior Publication Data
US 2018/0227749 A1    Aug. 9, 2018

Related U.S. Application Data
(60) Provisional application No. 62/205,047, filed on Aug. 14, 2015.

(51) Int. Cl.
| | |
|---|---|
| *H04W 8/30* | (2009.01) |
| *H04W 24/04* | (2009.01) |
| *H04W 76/22* | (2018.01) |
| *H04W 8/02* | (2009.01) |
| *H04W 88/16* | (2009.01) |
| H04W 76/30 | (2018.01) |

(52) U.S. Cl.
CPC ............... *H04W 8/30* (2013.01); *H04W 8/02* (2013.01); *H04W 24/04* (2013.01); *H04W 76/22* (2018.02); *H04W 88/16* (2013.01); H04W 76/30 (2018.02)

(58) Field of Classification Search
None
See application file for complete search history.

(56) References Cited

U.S. PATENT DOCUMENTS

| | | | |
|---|---|---|---|
| 2012/0063300 A1 | 3/2012 | Sahin et al. | |
| 2013/0324141 A1* | 12/2013 | Jung | ....................... H04W 4/70 455/450 |
| 2014/0016553 A1 | 1/2014 | Nishida et al. | |
| 2014/0056134 A1* | 2/2014 | Koskinen | .............. H04W 48/06 370/230 |
| 2014/0341041 A1* | 11/2014 | Velev | ................... H04Q 3/0045 370/236 |

(Continued)

OTHER PUBLICATIONS

3GPP TSG CT4 Meeting #70, "eDRX Impact on GTP v2 for Network Originated Control Plane Procedure" Aug. 2015 (Year: 2015).*

(Continued)

*Primary Examiner* — Jamaal Henson
(74) *Attorney, Agent, or Firm* — Withrow & Terranova, PLLC

(57) ABSTRACT

Example embodiments presented herein are directed towards a Serving Gateway, a core network node and a Policy Control and Charging Rules Function, as well as corresponding methods therein, for managing a Packet Data Network connection of a wireless device.

12 Claims, 9 Drawing Sheets

(56) References Cited

U.S. PATENT DOCUMENTS

2015/0141030 A1\* 5/2015 Basu-Mallick ....... H04W 76/36
455/452.1

OTHER PUBLICATIONS

3GPP; Technical Specification Group Core Network and Terminals; Restoration Procedures (Release-13), 3GPP Standard; 3GPP TS 23.007, 3rd Generation Partnership Project (3GPP-2), Mobile Competence Centre; Jun. 2015 (Year: 2015).\*
3GPP TSG CT4 Meeting #70 "eDRX Impact on GTP v2 for Network Originated Control Plane Procedure" (Year: 2015).\*
3GPP; Technical Specfication Group Core Network and Terminals; Restoration Procedures (Release-13), 3GPP Stand; 3GPP TS 23.007, 3rd Generation Partnership Project (3GPP-2), Mobile Competence Centre (Year: 2015).\*
Author Unknown, "Technical Specification Group Services and System Aspects; Study on System Impacts of Extended DRX Cycle for Power Consumption Optimization (Release 13)," 3GPP TR 23.770, Version 1.1.0, Jun. 2015, 3GPP Organizational Partners, pp. 18-19.
Office Action for Japanese Patent Application No. 2018-506409, dated Feb. 1, 2019, 5 pages.
Author Unknown, "Technical Specification Group Core Network and Terminals; Resoration procedures (Release 13)," Technical Specification 23.007, Version 13.1.0, 3GPP Organizational Partners, Jun. 2015, 94 pages.
Author Unknown, "Technical Specification Group Services and System Aspects; General Packet Radio Service (GPRS); Service description; Stage 2 (Release 13)," Technical Specification 23.060, Version 13.3.0, 3GPP Organizational Partners, Jun. 2015, 358 pages.
Author Unknown, "Technical Specification Group Services and System Aspects; Functional stage 2 desciption of Location Services (LCS) (Release 12)," Technical Specification 23.271, Version 12.1.0, 3GPP Organizational Partners, Jun. 2014, 169 pages.
Author Unknown, "Technical Specification Group Services and System Aspects; Circuit Switched (CS) fallback in Evolved Packet System (EPS); Stage 2 (Release 13)," Technical Specification 23.272, Version 13.0.0, 3GPP Organizational Partners, Jun. 2015, 100 pages.
Author Unknown, "Technical Specification Group Services and System Aspects; General Packet Radio Service (GPRS) enhancements for Evolved Universal Terrestrial Radio Access Network (E-UTRAN) access (Release 13)," Technical Specification 23.401, Version 13.3.0, 3GPP Organizational Partners, Jun. 2015, 324 pages.
Author Unknown, "Technical Specification Group Services and System Aspects; Architecture enhancements to facilitate communications with packet data networks and applications (Release 13)," Technical Specification 23.682, Version 13.2.0, 3GPP Organizational Partners, Jun. 2015, 70 pages.
Author Unknown, "Technical Specification Group Core Network and Terminals; 3GPP Evolved Packet System (EPS); Evolved General Packet Radio Service (GPRS) Tunnelling Protocol for Control plan (GTPv2-C); Stage 3 (Release 13)," Technical Specification 29.274, Version 13.2.0, 3GPP Organizational Partners, Jun. 2015, 319 pages.
Ericsson, "C4-151145: eDRX Impact on GTPv2 for Network Originated Control Plane Procedure," Change Request 29.274, Version 13.2.0, Third Generation Partnership Project (3GPP) TSG CT4 Meeting #70, Aug. 17-21, 2015, Vancouver, Canada, 43 pages.
Qualcomm Incorporated, "S2-152618: Introducing Extended Idle Mode DRX Feature to LTE," Change Request 23.401, Version 13.3.0, Third Generation Partnership Project (3GPP) TSG-SA2 WG2 Meeting #110, Jul. 6-10, 2015, Dubrovnik, Croatia, 38 pages.
Qualcomm Incorporated, "S2-152619: Introducing Extended Idle Mode DRX Feature," Change Request 23.060, Version 13.3.0, Third Generation Partnership Project (3GPP) TSG-SA2 WG2 Meeting #110, Jul. 6-10, 2015, Dubrovnik, Croatia, 44 pages.
International Search Report and Written Opinion for International Patent Application No. PCT/EP2016/064395, dated Nov. 28, 2016, 19 pages.
Partial European Search Report for European Patent Application No. 19152306.7, dated May 20, 2019, 17 pages.
Extended European Search Report for European Patent Application No. 19152306.7, dated Aug. 21, 2019, 14 pages.
Search Report for Japanese Patent Application No. 2018-506409, dated Jan. 24, 2019, 24 pages.
Notification of Reason for Refusal for Korean Patent Application No. 10-2018-7007031, dated Jul. 15, 2019, 4 pages.
Ericsson, "S2-152534: Introducing the solution for S/P-GW retransmissions when handling Network originated control plane procedure," Change Request 23.401, Version 13.3.0, Third Generation Partnership Project (3GPP) TSG-SA WG2 Meeting #110, Jul. 6-10, 2015, Dubrovnik, Croatia, 36 pages.
Dualcomm Incorporated, "C4-151255: MME restoration handling with extended DRX," CT WG4 Meeting #70, May 17-29, 2015, Vancouver, Canada, 3GPP, 2 pages.
Notice of Preliminary Rejection for Korean Patent Application No. 10-2018-7007031, dated Jan. 18, 2019, 9 pages.

\* cited by examiner

NODE AND METHOD FOR MANAGING A PACKET DATA NETWORK CONNECTION

This application is a 35 U.S.C. § 371 national phase filing of International Application No. PCT/EP2016/064395, filed Jun. 22, 2016, which claims the benefit of U.S. Provisional Application No. 62/205,047, filed Aug. 14, 2015, the disclosures of which are incorporated herein by reference in their entireties.

TECHNICAL FIELD

Example embodiments presented herein are directed towards a Serving Gateway, a core network node and a Policy Control and Charging Rules Function, as well as corresponding methods therein, for managing a Packet Data Network connection of a wireless device.

BACKGROUND

In a typical cellular system, also referred to as a wireless communications network, wireless terminals, also known as mobile stations and/or user equipment units communicate via a Radio Access Network (RAN) to one or more core networks. The wireless terminals can be Machine-to-Machine (M2M) devices, Internet-of-Things devices, mobile stations or user equipment units such as mobile telephones also known as "cellular" telephones, and laptops with wireless capability, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

SUMMARY

During the operation of the wireless communications network, there may be instances in which core network nodes fail or need to be restarted. Different procedures are in place to keep communication disturbances to a minimum during such failures or restarting of core network nodes. An example of such a procedure is a Network Triggered Service Restoration procedure as specified in 3GPP TS 23.007, chapter 25. In such a procedure, a node referred to as a Serving Gateway (SGW) detects that mobility management node, for example, a Mobility Management Entity (MME) or a Serving General packet radio service Support Node (SGSN), has failed, the SGW will be required to keep the PDN connection. Later on, the SGW will issue a Downlink Data Notification with the IMSI of the wireless device associated with the PDN connection when it receives any downlink data for the wireless device.

However, with recently developed new mechanism, especially for machine type of wireless device, where wireless device may use extended DRX or enter Power Saving Mode, which isn't able to listen the paging request, in such case, paging triggered at receiving Downlink Data makes no sense at all, it just generates extra signaling over the network. Such wireless device often uses those delay tolerant service, i.e. the service can be delayed until the wireless device is reachable by the network. However, it doesn't preclude the possibility to use a non-delay tolerant service.

Furthermore, there currently does not exist a means of providing dynamic or updated information regarding possible to change the attribute if a PDN connection is delay tolerance which is depending on what kind of services the wireless device is authorized to use.

In addition, there currently does not exist any specification that how such delay tolerant attribute of a PDN connection can affect the management of a PDN connection in the presence of a mobility management node failure or restart.

Thus, at least one object of the example embodiments presented herein is how to effectively provide a mechanism when Network Triggered Service Restoration procedure is deployed in a communications network in which a wireless device may be in an extended DRX or Power Saving Mode. In particular, an object of the example embodiments presented herein is how to manage a PDN connection for a wireless device with a network deployed with the Network Triggered Service Restoration Procedure in the presence of a mobility management node failure or restart.

At least one example advantage of the embodiments presented herein is that unnecessary signaling is reduced. Based on an ability of a PDN connection, associated with the wireless device, to receive delayed communications, the PDN connection may or may not be maintained in the presence of a mobility management node failure or restart. Furthermore, another example advantage is that changes in delay tolerance, for example, due to service or application usage, may be taken into account with respect to the management of the PDN connection.

Accordingly, some of the example embodiments are directed towards a method, in a SGW for managing a PDN connection for a wireless device. The SGW is configured to support the Network Triggered Service Restoration Procedure. The method comprises receiving, from at least one GTP, entity, a Delay Tolerance Connection Indicator (DTCI) indicating if communications on an identified PDN connection towards the wireless device can be delayed. The method further comprises storing the DTCI within the SGW. The method also comprises, upon detection of a failure (with restart or without restart) of a mobility management node serving the wireless device, managing the PDN connection. The managing comprises deleting the PDN connection if the DTCI indicates the PDN connection is delay tolerant. Or, the managing further comprises maintaining the PDN connection if the DTCI indicates the PDN connection is not delay tolerant.

Some of the example embodiments are directed towards a SGW for managing a PDN connection for a wireless device. The SGW is configured to support a Network Triggered Service Restoration Procedure. The SGW comprises a processor and a memory. The memory comprises instructions executable by the processor whereby the SGW is operative to receive, from at least one GTP, entity, a DTCI indicating if communications on an identified PDN connection towards the wireless device can delayed. The SGW is further operative to store the DTCI within the SGW. The SGW is also operative to, upon detection of a failure (with restart or without restart) of a mobility management node serving the wireless device, manage the PDN connection. Within the management of the PDN connection, the SGW is operative to delete the PDN connection if the DTCI indicates the PDN connection is delay tolerant. Alternatively, the SGW is operative to maintain the PDN connection if the DTCI indicates the PDN connection is not delay tolerant.

Some of the example embodiments are directed towards a method, in a core network node, for dynamically managing a PDN connection for a wireless device. The core network node comprises a stored DTCI indicating if communications on an identified PDN connection for the wireless device can be delayed. The method comprises receiving, from a PCRF or another core network node, an updated DTCI indicating a changed status with respect to if the identified PDN connection for the wireless device is delay tolerant. The method also comprises storing the updated DTCI within the core network node.

Some of the example embodiments are directed towards a core network node for dynamically managing a PDN connection for a wireless device. The core network node comprises a stored DTCI indicating if communications on an identified PDN connection for the wireless device can be delayed. The core network node comprises a processor and a memory. The memory comprises instructions executable by the processor whereby the core network node is operative to receive, from a PCRF or another core network node, an updated DTCI indicating a changed status with respect to if the identified PDN connection for the wireless device is delay tolerant. The core network node is further operative to store the updated DTCI within the core network node.

Some of the example embodiments are directed towards a method, in a PCRF, for dynamically managing a PDN connection for a wireless device. The method comprises detecting a status change in a delay tolerance of the PDN connection. The status change presents a change with respect to if the identified PDN connection for the wireless device is capable of receiving delayed communications. The method further comprises updating a DTCI based on the detected status change. The method further comprises sending, to a PGW, the updated DTCI.

Some of the example embodiments are directed towards a PCRF for dynamically managing a PDN connection for a wireless device. The PCRF comprises a processor and a memory. The memory comprising instructions executable by the processor whereby said PCRF is operative to detect a status change in a delay tolerance of the PDN connection. The status change represents a change with respect to if the identified PDN connection for the wireless device is capable of receiving delayed communications. The PCRF is further operative to update a DTCI based on the detected status change. The PCRF is also operative to send, to a PDN Gateway, PGW, the updated DTCI.

Abbreviations

3GPP Third Generation Partnership Project
AS Application Server
BSC Base Station Controller
DRX Discontinuous Reception
DTCI Delay Tolerance Connection Indicator
E-UTRAN Evolved Universal Terrestrial Radio Access Network
eNodeB Evolved NodeB
EPC Evolved Packet Core
GERAN GSM/EDGE Radio Access Network
GGSN Gateway GPRS Support Node
GPRS General Packet Radio Service
GTP GPRS Tunneling Protocol
GSM Global System for Mobile Communications
HSS Home Subscriber Server
IMSI International Mobile Subscriber Identity
IoT Internet of Things
LTE Long Term Evolution
M2M Machine-to-Machine
MME Mobility Management Entity
PCRF Policy Control and Charging Rules Function
PDN Packet Data Network
PGW PDN Gateway
RAN Radio Access Network
RAU Routing Area Update
RBS Radio Base Station
RNC Radio Network Controller
RRC Radio Resource Control
SGSN Serving GPRS Support Node
SGW Serving Gateway
TAU Tracking Area Update
UE User Equipment
UMTS Universal Mobile Telecommunications System
UTRAN UMTS Terrestrial Radio Access Network
WCDMA Wideband Code Division Multiple Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale; emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that all of the example embodiments presented herein may be applicable to a GERAN, UTRAN or E-UTRAN based system. It should further be appreciated that the term wireless device, wireless terminal, M2M device, MTC device, IoT device and user equipment may be used interchangeably.

General Overview

The example embodiments presented herein are directed towards the management of a PDN connection within a communication network which supports a Network Triggered Service Restoration procedure. In order to provide a better explanation of the example embodiments presented herein, a problem will first be identified and discussed.

Communications Network Overview

Figure 1:
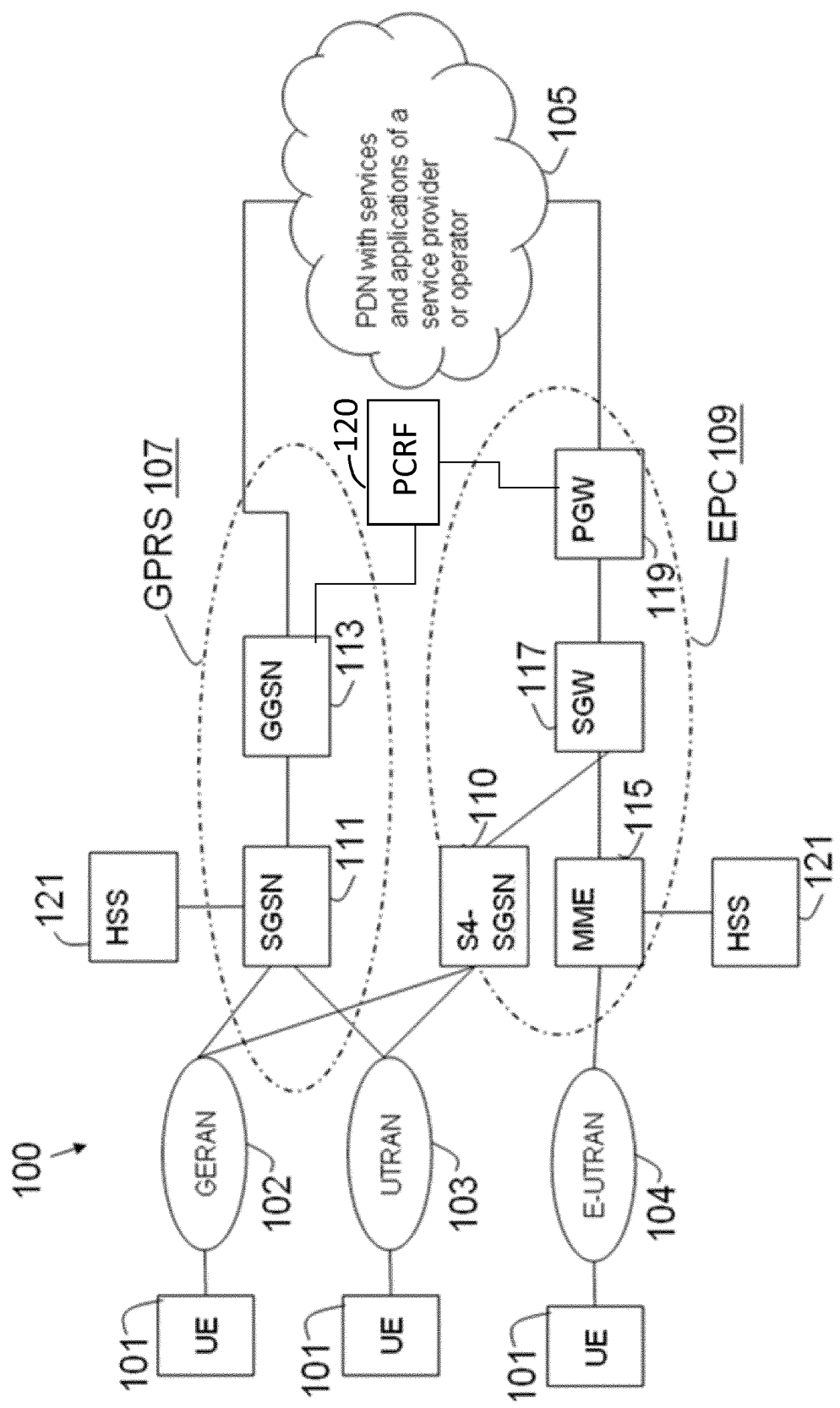
FIG. 1 is an illustrative example of a wireless network.

FIG. 1 provides a general example of a communication network 100. As shown in FIG. 1, a user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to SCS, AS or hosts 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) also known as Gn/Gp-SGSN 111, which may be responsible for the delivery of data packets to and from the mobile stations within an associated geographical service area. The SGSN 111 may also be responsible for packet routing, transfer, mobility management and connectivity management. The GPRS subsystem 107 may also include a Gateway GPRS Support Node 113, which may be responsible for the interworking between the GPRS subsystem 107 and the PDN 105.

The EPC subsystem 109 may comprise a Mobility Management Entity 115, which may be responsible for mobility management, connectivity management, idle mode UE tracking, paging procedures, attachment and activation procedures, and small data and message transfer towards the E-UTRAN 104. The EPC subsystem may also comprise a Serving Gateway (SGW) 117, which may be responsible for the routing and forwarding of data packets. The EPC subsystem may also include a Packet data network Gateway (PGW) 119, which may be responsible for providing connectivity from the user equipment 101 to one or more PDN(s) 105. Both the SGSN 111, the S4-SGSN 110 and the MME 115 may be in communication with a Home Subscriber Server (HSS) 121, which may provide device identification information, an International Mobile Subscriber Identity (IMSI), subscription information, etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

The network further comprises a Policy Control and Charging Rules Function (PCRF) 120. The PCRF 120 encompasses policy control decision and flow-based charging control functionalities.

Extended Idle Mode DRX

3GPP has concluded a new technical study partly—Machine-Type and other mobile data applications Communications enhancements, more precisely for "UE Power Consumption Optimizations (UEPCOP)" part, where extended DRX for wireless device in idle mode and wireless device Power Saving Mode are introduced.

The wireless device and the network may negotiate over non-access stratum signaling the use of extended idle mode DRX for reducing its power consumption, while being available for mobile terminating data and/or network originated procedures within a certain delay dependent on the DRX cycle value.

Applications that want to use extended idle mode DRX need to consider specific handling of mobile terminating services or data transfers, and in particular they need to consider the delay tolerance of mobile terminated data. A network side application may send mobile terminated data, an SMS, or a device trigger, and needs to be aware that extended idle mode DRX may be in place.

In order to negotiate the use of extended idle mode DRX, the wireless device requests extended idle mode DRX parameters during attach procedure and RAU/TAU procedure. The SGSN/MME may reject or accept the wireless device request for enabling extended idle mode DRX. In case the SGSN/MME accepts the extended idle mode DRX, the SGSN/MME based on operator policies may also provide different values of the extended idle mode DRX parameters than what was requested by the UE. If the SGSN/MME accepts the use of extended idle mode DRX, the wireless device applies extended idle mode DRX based on the received extended idle mode DRX parameters. If the wireless device does not receive extended idle mode DRX parameters in the relevant accept message because the SGSN/MME rejected its request or because the request was received by SGSN/MME not supporting extended idle mode DRX, the wireless device shall apply its regular discontinuous reception as defined in TS 23.060, chapter 8.2.3 and TS 23.401, chapter 5.13.

If a wireless device requests via NAS both to enable PSM (requesting an active time and possibly a periodic TAU timer) and extended idle mode DRX (with a specific extended I-DRX cycle value), it is up to the SGSN/MME to decide whether to:
1. Enable only PSM, i.e. not accept the request for extended idle mode DRX.
2. Enable only extended idle mode DRX, i.e. not accept the request for an active time.
3. Enable both PSM (i.e. provide an active time) and extended idle mode DRX (i.e. provide an extended idle mode DRX parameters).

The decision between the three above, and which active time, periodic TAU timer and/or extended idle mode DRX cycle value to provide to the UE, are implementation dependent, based on local configuration, and possibly other information available in the SGSN/MME. The method selected is then used until the next Attach or RAU/TAU procedure is initiated, when a new decision may be made. If both extended I-DRX and PSM are enabled, the extended I-DRX cycle should be set in order to have multiple paging occasions while the active timer is running.

In the specific case when the PSM active time provided by the wireless device is greater than the extended idle mode DRX cycle value provided by the wireless device, the SGSN/MME may enable both PSM and extended idle mode DRX. This allows a wireless device to minimize power consumption during the active time e.g. when the active time is slightly longer than typical active time values for example in the order of several minutes.

In case extended idle mode DRX is enabled, the network handles mobile terminated data using high latency communication feature, as per clause 4.5.7, GTP-C retransmissions as described in TS 23.060 and TS 23.401, and applies techniques to handle mobile terminated SMS as per TS 23.272 and location services as per TS 23.271.

Wireless Device Power Saving Mode

A wireless device may adopt the PSM for reducing its power consumption. That mode is similar to power-off, but the wireless device remains registered with the network and there is no need to re-attach or re-establish PDN connections. A wireless device in PSM is not immediately reachable for mobile terminating services. A wireless device using PSM is available for mobile terminating services during the time it is in connected mode and for the period of an Active Time that is after the connected mode. The connected mode is caused by a mobile originated event like data transfer or signalling, e.g. after a periodic TAU/RAU procedure. PSM is therefore intended for wireless devices that are expecting only infrequent mobile originating and terminating services and that can accept a corresponding latency in the mobile terminating communication.

Overview of the Example Embodiments

During the operation of the wireless communications network, there may be instances in which core network nodes fail or need to be restarted. Different procedures are in place to keep communication disturbances to a minimum during such failures or restarting of core network nodes. An example of such a procedure is a Network Triggered Service Restoration procedure as specified in 3GPP TS 23.007, chapter 25. In such a procedure, a node referred to as a Serving Gateway (SGW) detects that mobility management node, for example, a Mobility Management Entity (MME) or a Serving General packet radio service Support Node (SGSN), has failed, the SGW will be required to keep the PDN connection. Later on, the SGW will issue a Downlink Data Notification with the IMSI of the wireless device associated with the PDN connection when it receives any downlink data for the wireless device.

However, with recently developed new mechanism, especially for machine type of wireless device, where wireless device may use extended DRX or enter Power Saving Mode, which isn't able to listen the paging request, in such case, paging triggered at receiving Downlink Data makes no sense at all, it just generates extra signaling over the network.

Furthermore, there currently does not exist a means of providing dynamic or updated information regarding possible to change the attribute if a PDN connection is delay tolerance which is depending on what kind of services the wireless device are authorized to use.

In addition, there currently does not exist any specification that how such delay tolerant attribute of a PDN connection can affect the management of a PDN connection in the presence of a mobility management node failure or restart.

Thus, at least one object of the example embodiments presented herein is how to effectively provide a mechanism for the case when Network Triggered Service Restoration procedure is deployed in a communications network in which a wireless device may be in an extended DRX or Power Saving Mode. In particular, an object of the example embodiments presented herein is how to manage a PDN connection for a wireless device within a network configured to support the Network Triggered Service Restoration Procedure. At least one other object of the example embodiments is how to effectively manage a PDN connection in the presence of a mobility management node failure or restart.

At least one example advantage of the embodiments presented herein is that unnecessary signaling is reduced. Based on an ability of a PDN connection, associated with the wireless device, to receive delayed communications, the PDN connection may or may not be maintained in the presence of a mobility management node failure or restart. Furthermore, another example advantage is that changes in delay tolerance, for example, due to service or application usage, may be taken into account with respect to the management of the PDN connection in view of a mobility management node failure or restart.

A new indication called a "Delay Tolerant Connection" is introduced, this indication is used by the PGW to indicate the PDN connection is delay tolerant, for example, the PGW supports receiving a rejection cause from the MME/SGSN via the SGW indicating that the wireless device is temporarily not reachable due to power saving during a network initiated procedure and holding the network initiated procedure, until the PGW receives the subsequent Modify Bearer Request message with the UASI indicating that the wireless device is available for end to end signalling, for this PDN connection. However, this delay tolerant connection indication is not used by the SGW.

PDN Connection Management During a Mobility Procedure with a SGW Change

According to some of the example embodiments, the SGW should make use of this indication, so that when the SGW detects MME/SGSN failure (MME/SGSN restart or failure without restart), the SGW shall not keep the PDN connections which are labelled with Delay Tolerant Connection. To achieve this, in addition, such information "the PDN connection is labelled with Delay Tolerant Connection" shall be transferred to the new SGW during a mobility procedure with SGW change, i.e. inter MME/SGSN TAU/RAU for UEs in the Idle mode and inter MME/SGSN handover procedure for UEs in the active/connected mode.

Such information can be included in Create Session Request message from the (target) MME/SGSN when the new SGW is contacted, or Modify Bearer Response from the PGW (the message is the response from the PGW when the new SGW updates itself to the PGW with the Modify Bearer Request message.

Figure 2:
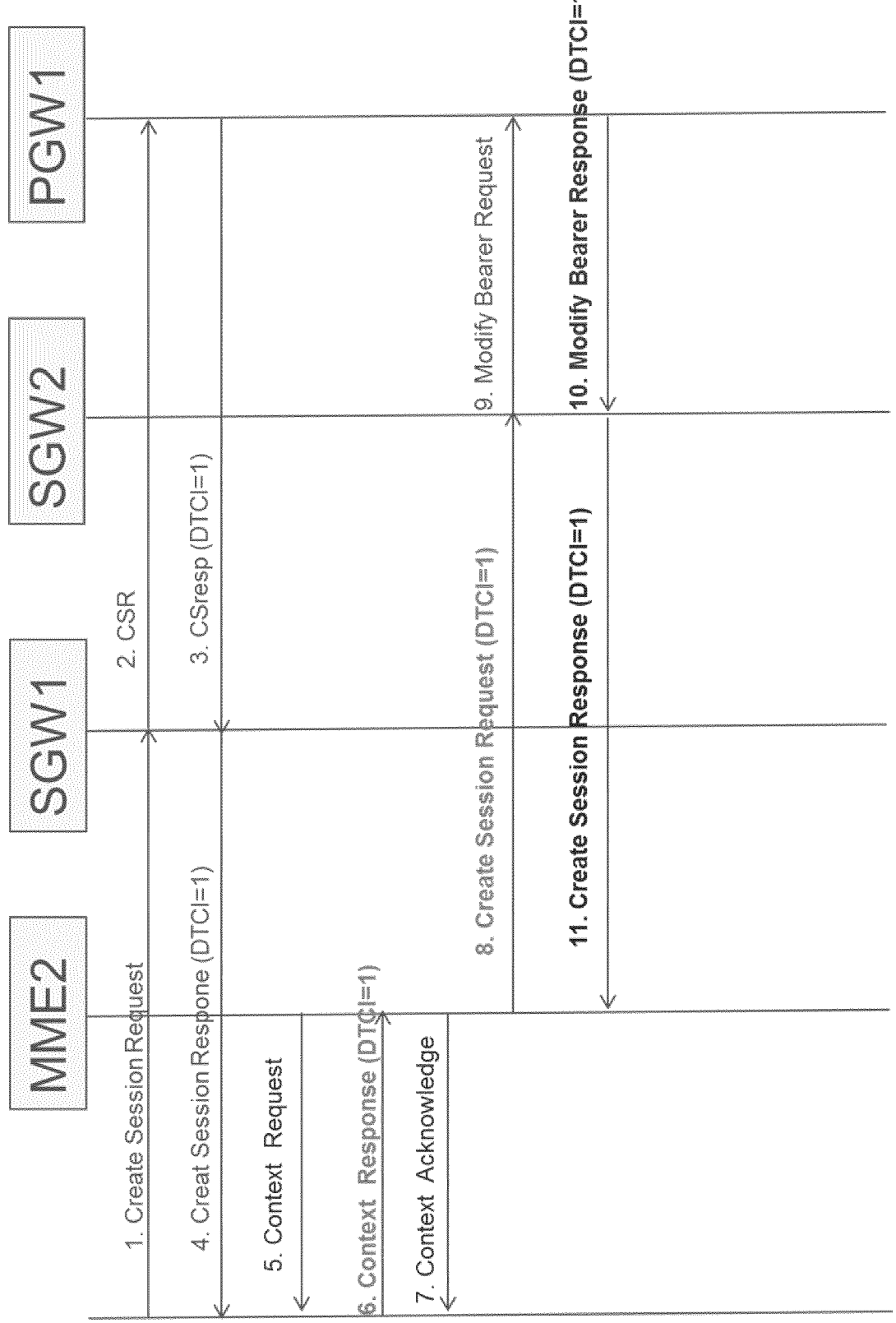
FIG. 2 is message passing diagram depicting the management of a PDN connection during a mobility procedure featuring a SGW relocation, according to some of the example embodiments presented herein.

FIG. 2 illustrates how the Delay Tolerant Connection Indication (DTCI) is transferred to the new SGW (SGW2 is the new SGW) during a mobility procedure with a SGW change.

The green bold text denotes the first alternative, using Context transfer procedure (Context Request/Response/Acknowledge) to transfer DTCI from the old MME/SGSN to the new MME/SGSN, and new MME/SGSN includes DTCI in the Create Session Request message to the new SGW.

The red bold text denotes the second alternative, using Modify Bearer Response, the PGW provides DTCI to the new SGW. In this option, it implicitly allows DTCI may be changed, so that in the subsequent signalling Create Session Response, the new SGW should forward DTCI to the new MME/SGSN.

MME is just an example; it may be an S4-SGSN, an MME or a Gn/Gp SGSN as the source (old) mobility management node; it may be an S4-SGSN or an MME as the target (new) mobility management node. PGW may be a PGW. The wireless device (UE) may camped on either 2G/3G or LTE.

Dynamic Management of Delay Tolerant Connection Indication for a Given PDN Connection According to prior art methods, a delay tolerant is set per PDN connection and only when the PDN connection is established, it can't be changed when the PDN connection is active.

However, according to the example embodiments presented herein, it should be allowed that a PDN connection may be labelled as Delay Tolerant Connection at the PDN connection, but changed to non-delay tolerant in a later stage; or vice versa.

For example:

1. When a wireless device activates a PDN connection, the PCRF, may set the PDN connection as delay tolerant connection, according to the current available subscription, e.g. Access Point Name, however if the wireless device later on, activates a service which is not delay tolerant, e.g., via a web portal to subscribe for certain service which is not delay tolerant or via contacting an application server to register a service which is not delay tolerant;

2. When the wireless device activates a PDN connection, the PCRF, may set the PDN connection as non-delay tolerant connection, while if the wireless device has expired its granted quota, or if the wireless device's subscription is changed, e.g. modified by end user via a web portal (when the end user is going to sleep)

In summary, the setting of Delay Tolerant or not, is not dependent if the wireless device has been activate power saving mode or extended DRX, but it depends on the services that UE is using. So that PCRF should be able to change the setting of Delay Tolerant Connection indication while the PDN connection remains active.

Figure 3:
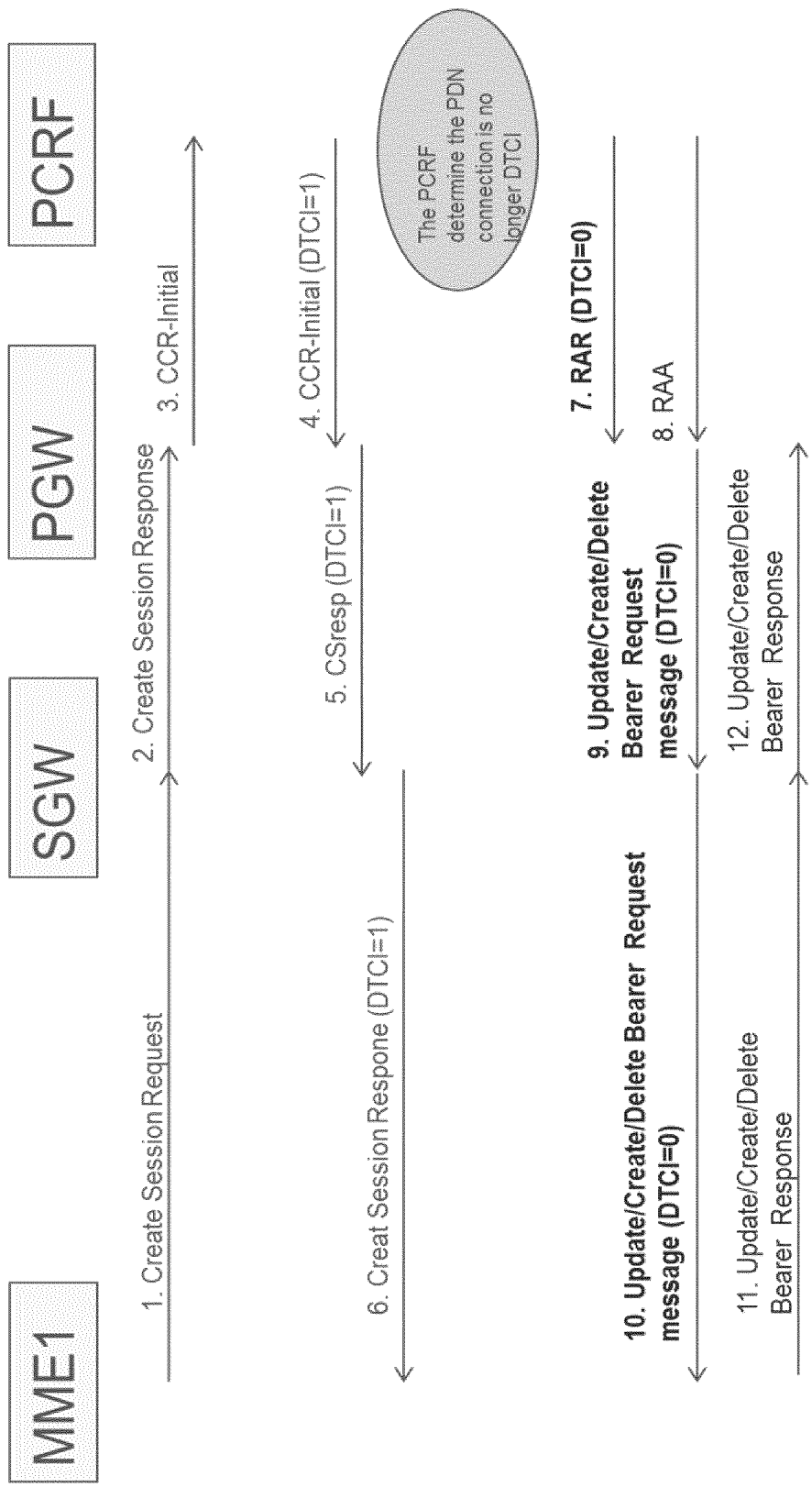
FIG. 3 is message passing diagram depicting the management of a PDN connection featuring a dynamic updating of a DTCI, according to some of the example embodiments presented herein.

FIG. 3 illustrates that the Delay Tolerant Connection Indication is during a PDN connection creation procedure, but later on, the PDN connection is reset to a normal PDN connection using Update Bearer Request message. It is possible for the PGW to use Create/Delete Bearer Request if the updated PCRF decision requires such bearer creation/deletion. The red highlighted text denotes the change due to this invention. According to some of the example embodiments, such a change may be based on an application or service change which the wireless device undergoes.

Example Node Configuration

Figure 4:
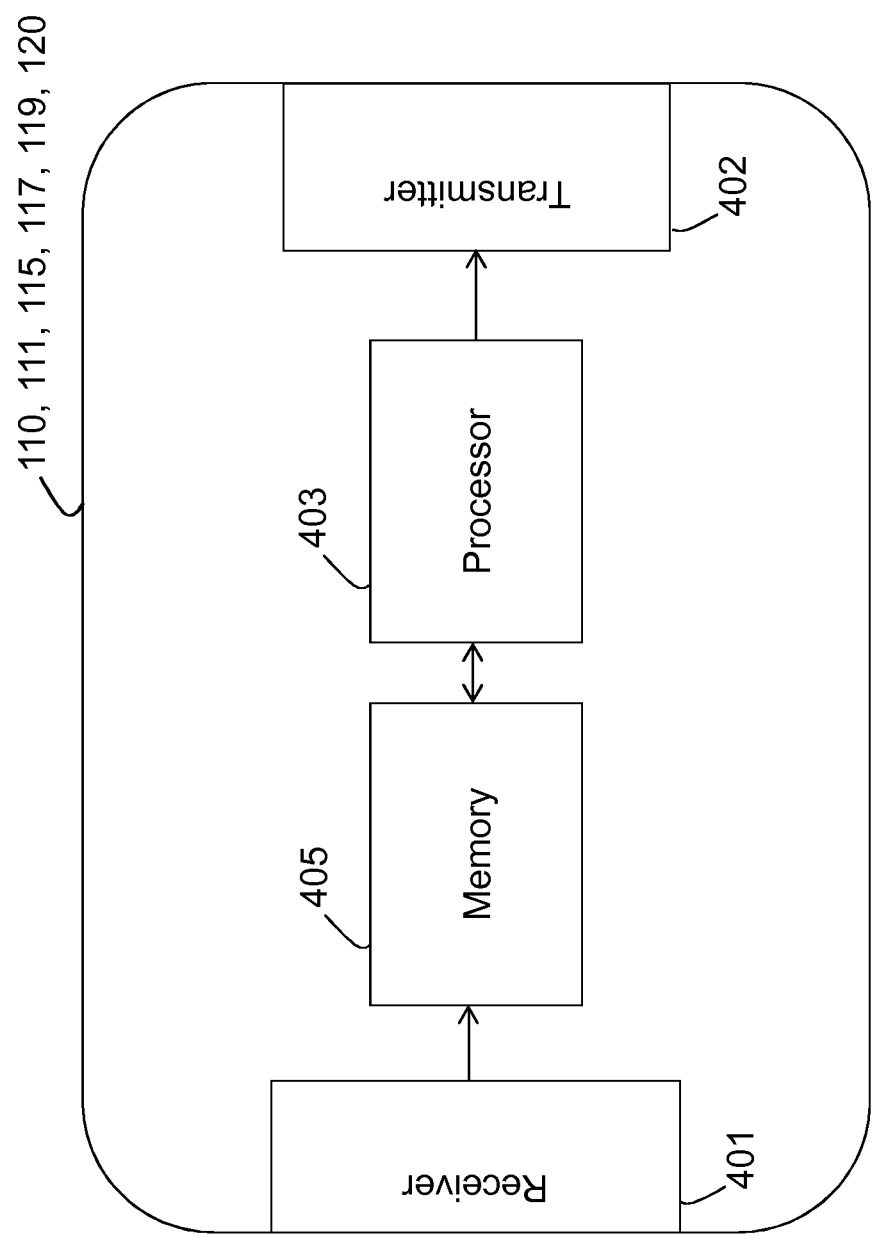
FIG. 4 is an example node configuration of a SGW, core network node and a PCRF, according to some of the example embodiments.

FIG. 4 illustrates an example node configuration of a node. Any node discussed herein may have the configuration illustrated in FIG. 4. Examples of such nodes are a SGW 117, a core network node (e.g., a SGSN 111, a S4-SGSN 110, a MME 115, or a PGW 119), and a PCRF 120. The node may provide PDN connection management in a communications network, according to the example embodiments described herein. The node may comprise a receiver 401 that may be configured to receive communication data, instructions, delay tolerance information, wireless device application or service usage information, and/or messages. The node may also comprise a transmitter 402 that may be configured to transmit communication data, instructions, delay tolerance information, wireless device application or service usage information, and/or messages. It should be appreciated that the receiver 401 and transmitter 402 may be comprised as any number of transceiving, receiving, and/or transmitting units, modules or circuitry. It should further be appreciated that the receiver 401 and transmitter 402 may be in the form of any input or output communications port known in the art. The receiver 401 and transmitter 402 may comprise RF circuitry and baseband processing circuitry (not shown).

The node may also comprise a processing unit or circuitry 403 which may be configured to process information related to the management of a PDN connection as described herein. The processing circuitry 403 may be any suitable type of computation unit, for example, a microprocessor, digital signal processor (DSP), field programmable gate array (FPGA), or application specific integrated circuit (ASIC), or any other form of circuitry or module. The node may further comprise a memory unit or circuitry 405 which may be any suitable type of computer readable memory and may be of volatile and/or non-volatile type. The memory 405 may be configured to store received, transmitted, and/or measured data, device parameters, communication priorities, delay tolerance information, wireless device application or service usage information, and/or executable program instructions.

Example Node Operations

Figure 5A:
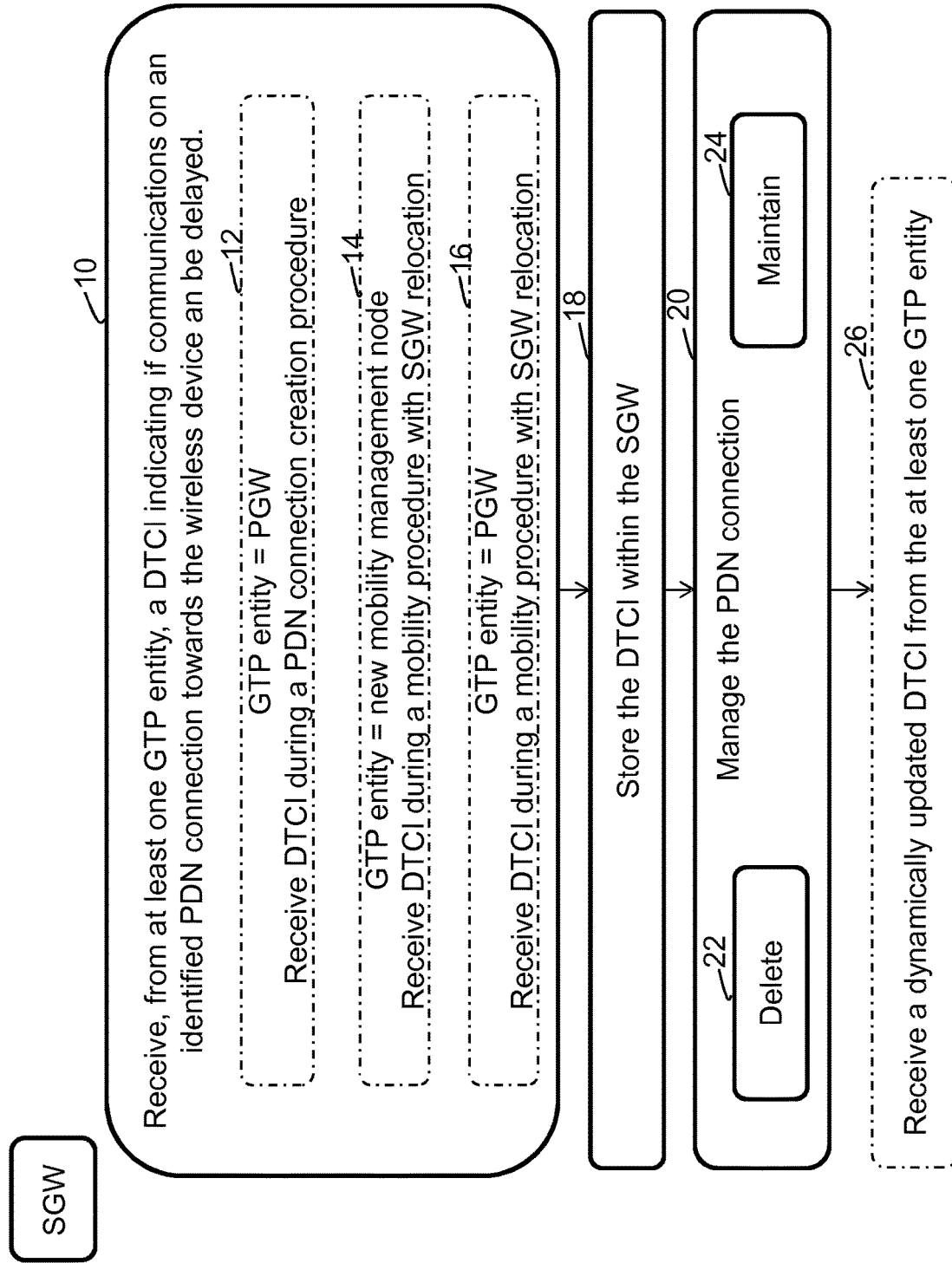
FIG. 5A is a flow diagram depicting example operations which may be taken by the SGW, according to some of the example embodiments.

FIG. 5A is a flow diagram depicting example operations which may be taken by the SGW for managing a PDN connection for a wireless device as described herein. It should also be appreciated that FIG. 5A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination. The example operations are further described in at least the non-limiting summary of example embodiments.

It should be appreciated that the numbering featured in FIG. 5A correspond to the reference numerals described in the 'Summary of the Example Embodiments' section.

Figure 5B:
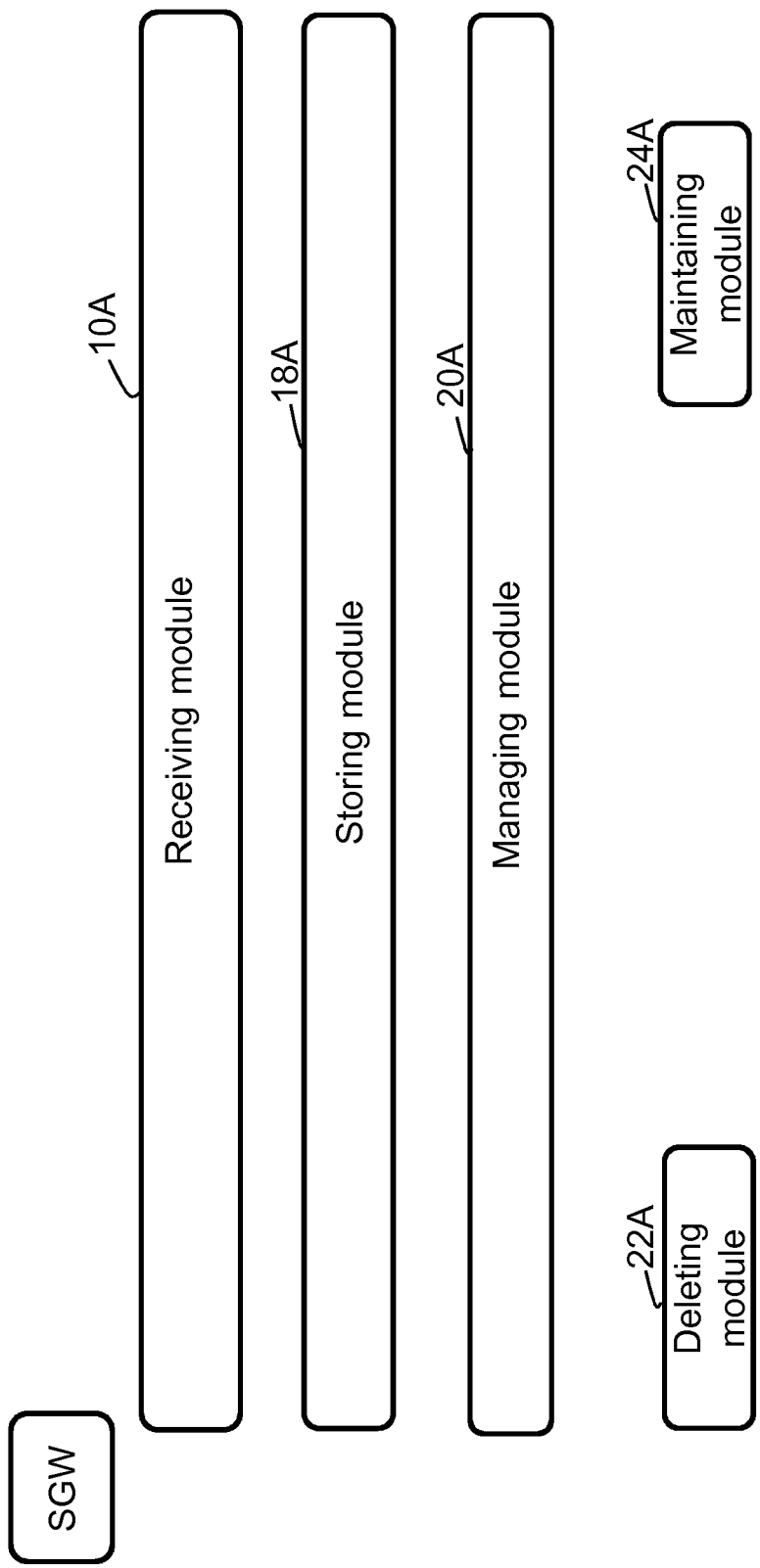
FIG. 5B is a module diagram depicting modules which are configured to perform the operations of FIG. 5A, according to some of the example embodiments.

FIG. 5B is a module diagram depicting modules which may perform at least some of the operations of FIG. 5A.

Figure 6A:
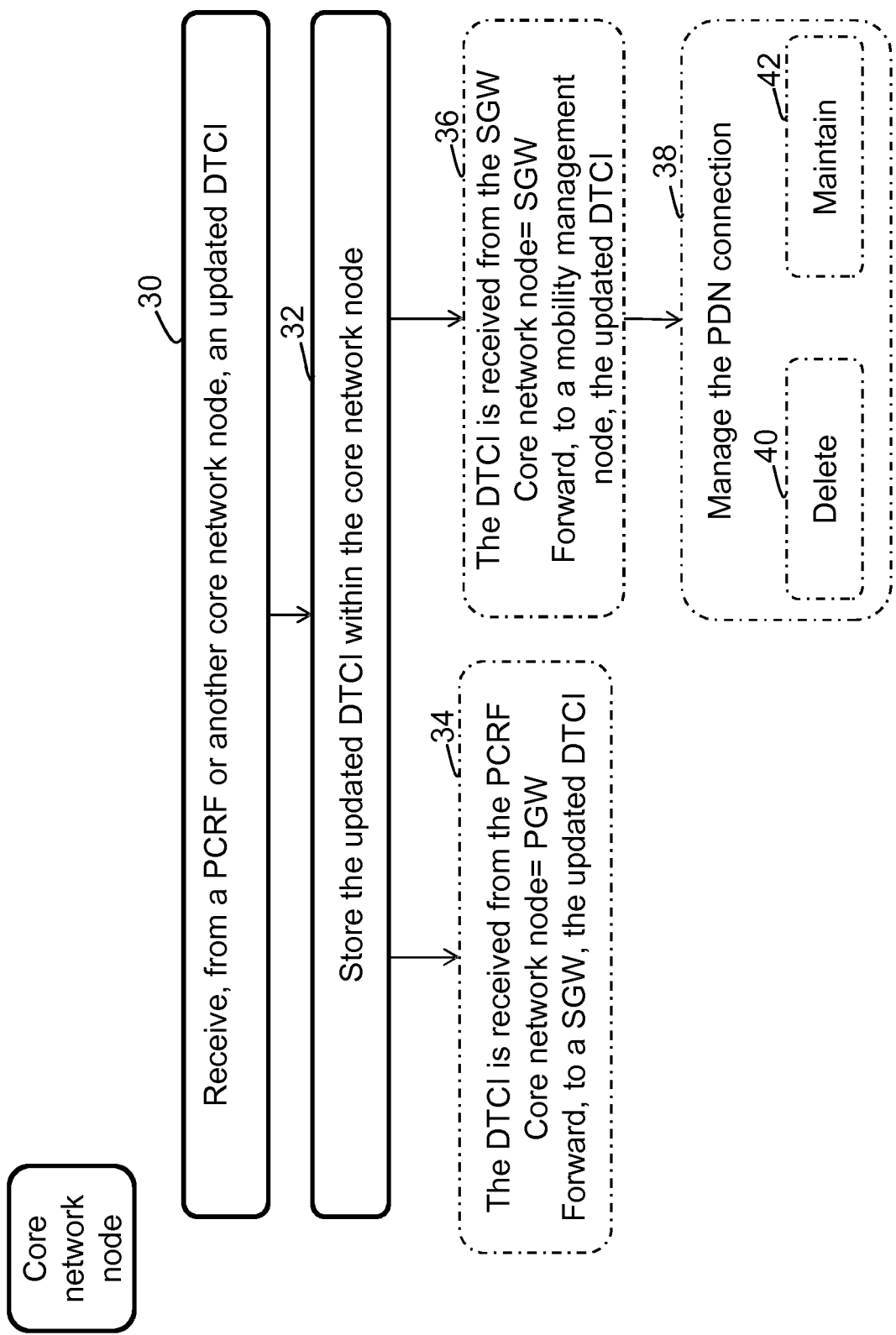
FIG. 6A is a flow diagram depicting example operations which may be taken by the core network node, according to some of the example embodiments.

FIG. 6A is a flow diagram depicting example operations which may be taken by the core network node for managing a PDN connection for a wireless device as described herein. It should also be appreciated that FIG. 6A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination. The example operations are further described in at least the non-limiting summary of example embodiments.

It should be appreciated that the numbering featured in FIG. 6A correspond to the reference numerals described in the 'Summary of the Example Embodiments' section.

Figure 6B:
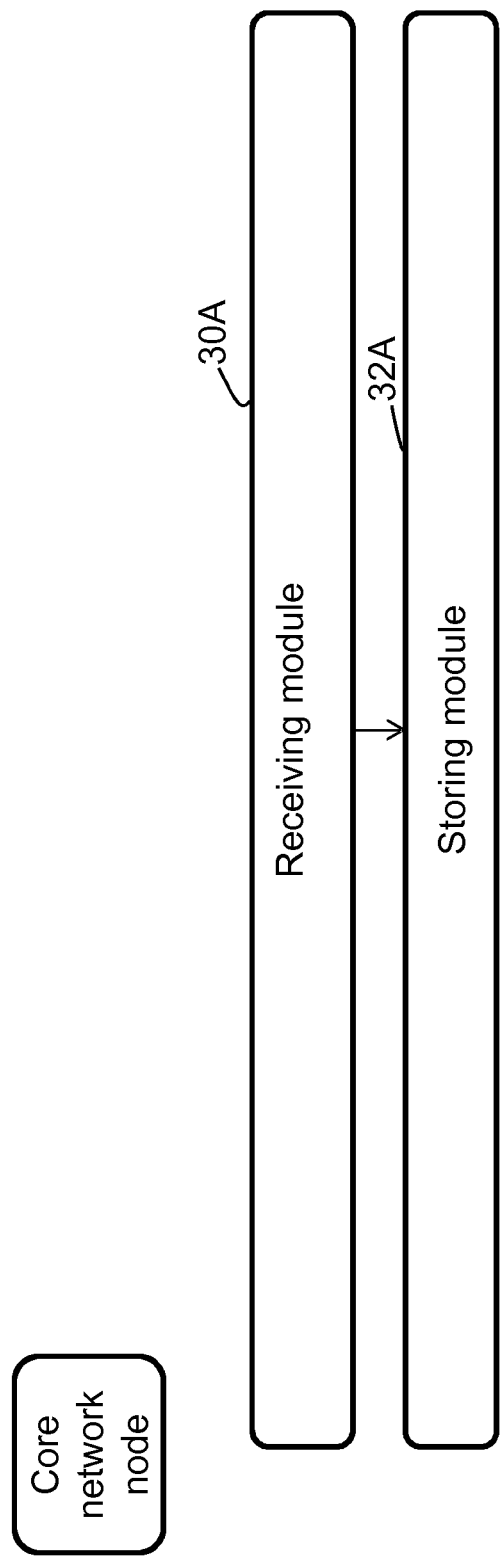
FIG. 6B is a module diagram depicting modules which are configured to perform the operations of FIG. 6A, according to some of the example embodiments.

FIG. 6B is a module diagram depicting modules which may perform at least some of the operations of FIG. 6A.

Figure 7A:
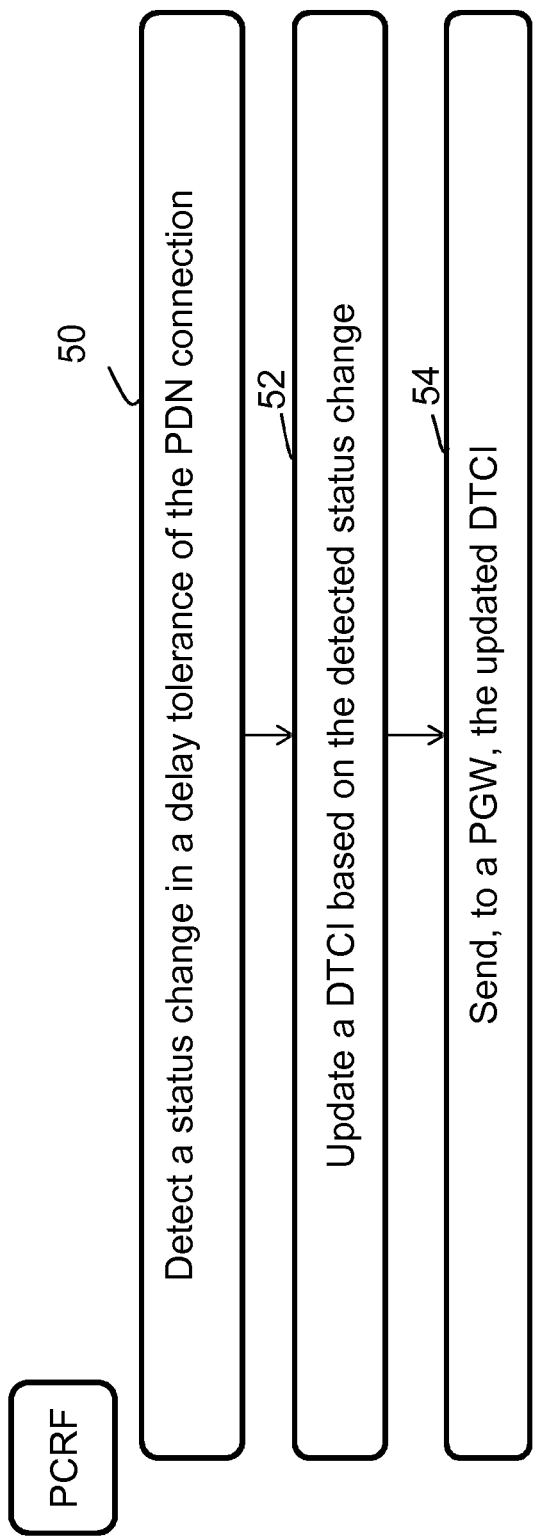
FIG. 7A is a flow diagram depicting example operations which may be taken by the PCRF, according to some of the example embodiments.

FIG. 7A is a flow diagram depicting example operations which may be taken by the PCRF for managing a PDN connection for a wireless device as described herein. It should also be appreciated that FIG. 7A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination. The example operations are further described in at least the non-limiting summary of example embodiments.

It should be appreciated that the numbering featured in FIG. 7A correspond to the reference numerals described in the 'Summary of the Example Embodiments' section.

Figure 7B:
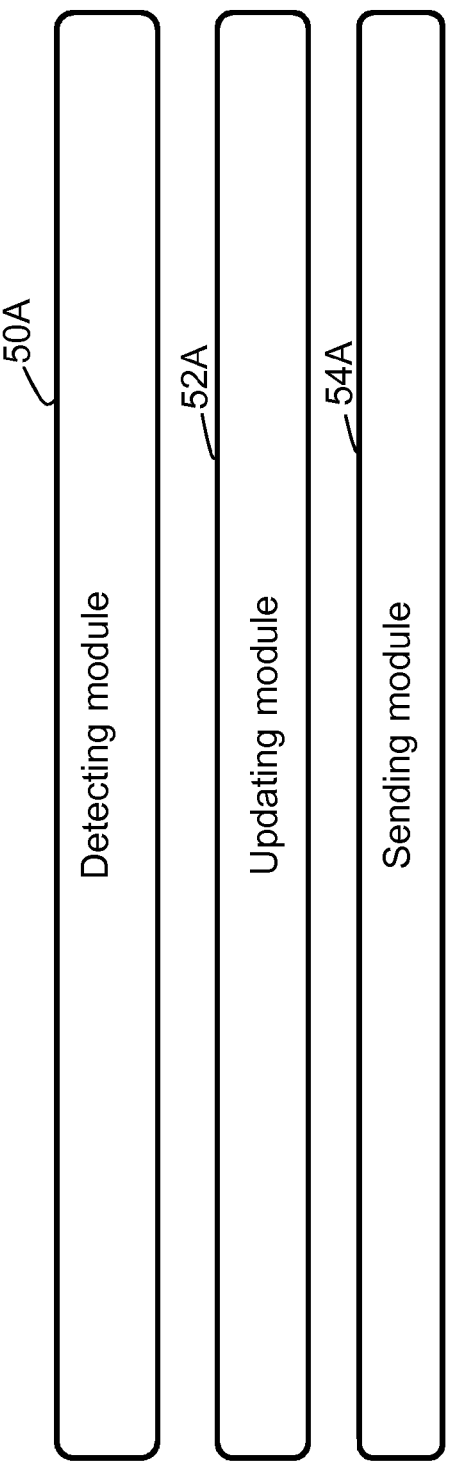
FIG. 7B is a module diagram depicting modules which are configured to perform the operations of FIG. 7A, according to some of the example embodiments.

FIG. 7B is a module diagram depicting modules which may perform at least some of the operations of FIG. 7A.

Some embodiments describe above may be summarized in the following manner:

One embodiment is directed to a method in a SGW for managing a PDN connection for a wireless device. The method comprises: receiving, from at least one GTP entity, a DTCI indicating if communications on an identified PDN connection towards the wireless device can be delayed; storing the DTCI within the SGW; and upon detection of a failure (with restart or without restart) of a mobility management node serving the wireless device, managing the PDN connection, wherein the managing comprises; deleting the PDN connection if the DTCI indicates the PDN connection is delay tolerant; or maintaining the PDN connection if the DTCI indicates the PDN connection is not delay tolerant.

It should be appreciated that not setting the DTCI may also be used together with other features and other operator policies to determine if the PDN connection should be maintained. Examples of such features and operator policies are QCI/ARP/APN and such parameters. The SGW may determine if the PDN connection should be kept based on the DTCI, which may include any number of parameters.

According to such an example embodiment, the SGW will save the DTCI and manage the PDN connection based on the saved DTCI value. In contrast to prior art methods, the SGW blindly forwards such a value to the mobility management node. In prior art methods, the SGW does not utilize the DTCI.

In utilizing the DTCI, the SGW will, upon the detection of a failure (with a restart or without restart) of the mobility management node, may keep the PDN connection if the DTCI value indicates the connection is not delay tolerant. If the PDN connection is delay tolerant, the PDN connection will be deleted, that is, the PDN connection is not eligible for the network triggered service restoration procedure. This is to avoid unnecessary paging signalling since the wireless device may activate a power saving mechanism, for example, extended DRX is enabled, or entering power saving state.

The DTCI may be provided in the form of a flag, cause code or any other form of indication known in the art.

In the method, the at least one GTP entity may be a PGW, and the receiving may further comprise receiving, from the PGW, the DTCI during a PDN connection creation procedure.

According to such example embodiments, the DTCI may be provided, for example, during a PDN connection creation procedure in a Create Session Response message.

In the method, wherein the receiving occurs during a mobility procedure with a SGW relocation, the SGW may be a new SGW and the at least one GTP entity may be the new mobility management node which will serve the wireless device upon completion of the mobility procedure, the receiving further comprises receiving, from the new mobility management node, the DTCI during mobility procedure.

According to such example embodiments, the DTCI may be provided, for example, in a Context Response message. It should be appreciated that the new mobility management node receives the DTCI in a Context Response message from the old mobility management node.

In the method, wherein the receiving occurs during a mobility procedure with a SGW relocation, the SGW may be a new SGW and the at least one GTP entity may be a PGW, the receiving further comprises receiving, from the PGW, the (e.g. the current) DTCI during mobility procedure.

According to such example embodiments, the DTCI may be provided, for example, in a Modify Bearer Response message from the PGW.

The method may further comprise receiving a dynamically updated DTCI from the at least one GTP entity.

It should be appreciated that the dynamically updated DTCI may be provided in an Update/Create/Delete bearer request or a Modify Bearer Response message. According to some of the example embodiments, such a dynamic update of the DTCI may be based on service or application use changes employed by the wireless device. It should be appreciated that such a dynamically updated DTCI may originate from the PCRF and be provided to the SGW via the PGW.

In the method, the mobility management node may be a MME, a SGSN, or a S4-SGSN.

Some other embodiments describe above may be summarized in the following manner:

One other embodiment is directed to a SGW for managing a PDN connection for a wireless device. The SGW comprising a processor and a memory, said memory comprising instructions executable by said processor whereby said SGW is operative to: receive from at least one GTP entity a DTCI indicating if communications on an identified PDN connection towards the wireless device can be delayed; store the DTCI within the SGW; and upon detection of a failure (with restart or without restart) of a mobility management node serving the wireless device, manage the PDN connection, wherein the management comprises; delete the PDN connection if the DTCI indicates the PDN connection is delay tolerant; or maintain the PDN connection if the DTCI indicates the PDN connection is not delay tolerant.

It should be appreciated that not setting the DTCI may also be used together with other features and other operator policies to determine if the PDN connection should be maintained. Examples of such features and operator policies are QCI/ARP/APN and such parameters. The SGW may determine if the PDN connection should be kept based on the DTCI, which may include any number of parameters.

According to such an example embodiment, the SGW will save the DTCI and manage the PDN connection based on the saved DTCI value. In contrast to prior art methods, the SGW blindly forwards such a value to the mobility management node. In prior art methods, the SGW does not utilize the DTCI.

In utilizing the DTCI, the SGW will, upon the detection of a failure (with a restart or without restart) of the mobility management node, may keep the PDN connection if the DTCI value indicates the connection is not delay tolerant. If the PDN connection is delay tolerant, the PDN connection will be deleted, that is, the PDN connection is not eligible for the network triggered service restoration procedure. This is to avoid unnecessary paging signalling since the wireless device may activate a power saving mechanism, for example, extended DRX is enabled, or entering power saving state.

The DTCI may be provided in the form of a flag, cause code or any other form of indication known in the art.

With respect to the SGW of this exemplifying embodiment, the at least one GTP entity may be a PGW, and the SGW may be further operative to receive, from the PGW, the DTCI during a PDN connection creation procedure.

According to such example embodiments, the DTCI may be provided, for example, during a PDN connection creation procedure in a Create Session Response message.

With respect to the SGW of this exemplifying embodiment, the SGW may be operative to receive the DTCI during a mobility procedure with a SGW relocation, the SGW may be a new SGW and the at least one GTP entity may be the new mobility management which will serve the wireless device upon completion of the mobility procedure, the SGW may further be operative to receive, from the new mobility management node, the DTCI during mobility procedure.

According to such example embodiments, the DTCI may be provided, for example, in a Context Response message. It should be appreciated that the new mobility management node receives the DTCI in a Context Response message from the old mobility management node.

With respect to the SGW of this exemplifying embodiment, the SGW may be operative to receive the DTCI during a mobility procedure with a SGW relocation, the SGW may be a new SGW and the at least one GTP entity may be a PGW, the SGW may further be operative to receive, from the PGW, the (e.g. the current) DTCI during mobility procedure.

According to such example embodiments, the DTCI may be provided, for example, in a Modify Bearer Response message from the PGW.

With respect to the SGW of this exemplifying embodiment, the SGW may be further operative to receive a dynamically updated DTCI from the at least one GTP entity It should be appreciated that the dynamically updated DTCI may be provided in an Update/Create/Delete bearer request or a Modify Bearer Response message. According to some of the example embodiments, such a dynamic update of the DTCI may be based on service or application use changes employed by the wireless device. It should be appreciated that such a dynamically updated DTCI may originate from the PCRF and be provided to the SGW via the PGW.

With respect to the SGW of this exemplifying embodiment, the mobility management node may be a Mobility Management Entity, a Serving General packet radio service Support Node (SGSN), or a S4-SGSN Some other embodiments describe above may be summarized in the following manner:

One other embodiment is directed to a method, in a core network node for dynamically managing a PDN, connection for a wireless device (101), the core network node comprising a stored DTCI, indicating if communications on an identified PDN connection for the wireless device can be delayed, the core network node being configured for a Network Triggered Service Restoration Procedure. The method comprises: receiving, from a PCRF, or another core network node, an updated DTCI indicating a changed status with respect to if the identified PDN connection for the wireless device is delay tolerant; and storing the updated DTCI within the core network node.

According to such embodiments, the DTCI, as an attribute of a PDN connection, is provided in a dynamic fashion. Thus, an updated DTCI is provided when the PDN connection is active (i.e., not only during an initial attach, or a PDN connection creation procedure or a mobility procedure).

According to such example embodiments, the update to the DTCI is based on an application or service being utilized by the identified PDN connection for the wireless device. For example, a PDN connection which was previously identified as being delay tolerant according to subscribed or authorized services and later on it is used for services in which a delay is not acceptable. Thus, an updated DTCI is sent indicating that the PDN connection is not delay tolerant.

The DTCI may be provided in the form of a flag, cause code or any other form of identification known in the art.

In the method, the updated DTCI may be received from the PCRF and the core network node may be a PGW, and the method may further comprise; forwarding, to a SGW, the updated DTCI.

According to such example embodiments, the updated DTCI may be provided from the PCRF to the PGW in a Re-Authorization Request message.

In the method, the updated DTCI may be received from a PGW, and the core network node may be a SGW, and the method may further comprise forwarding, to a mobility management node, the updated DTCI.

The method may further comprise managing the PDN connection, wherein the managing comprises: deleting the PDN connection if the DTCI indicates the PDN connection is delay tolerant; or maintaining the PDN connection if the DTCI indicates the PDN connection is not delay tolerant.

According to such example embodiments, the updated DTCI may be provided from the PGW to the SGW in an Update/Create/Delete Bearer Request message.

In the method, the updated DTCI may be received from a SGW, and the core network node may be a mobility management node.

In the method, the mobility management node may be a Mobility Management Entity, a Serving General packet radio service Support Node (SGSN), or a S4-SGSN.

Some other embodiments describe above may be summarized in the following manner:

One other embodiment is directed to a core network node for dynamically managing a PDN connection for a wireless device. The core network node comprises a stored DTCI indicating if communications on an identified PDN connection for the wireless device can be delayed. The core network node comprises a processor and a memory, said memory comprising instructions executable by said processor whereby said core network node is operative to: receive, from a PCRF or another core network node, an updated DTCI indicating a changed status with respect to if the identified PDN connection for the wireless device is delay tolerant; and store the updated DTCI within the core network node.

According to such embodiments, the DTCI, as an attribute of a PDN connection, is provided in a dynamic fashion. Thus, an updated DTCI is provided when the PDN connection is active (i.e., not only during an initial attach, or a PDN connection creation procedure or a mobility procedure).

According to such example embodiments, the update to the DTCI is based on an application or service being utilized by the identified PDN connection for the wireless device. For example, a PDN connection which was previously identified as being delay tolerant according to subscribed or authorized services and later on it is used for services in which a delay is not acceptable. Thus, an updated DTCI is sent indicating that the PDN connection is not delay tolerant.

The DTCI may be provided in the form of a flag, cause code or any other form of identification known in the art.

With respect to the core network node of this exemplifying embodiment, the updated DTCI may be received from the PCRF and the core network node may be a PGW, the core network node may be further operative to forward, to a SGW, the updated DTCI.

According to such example embodiments, the updated DTCI may be provided from the PCRF to the PGW in a Re-Authorization Request message.

With respect to the core network node of this exemplifying embodiment, the updated DTCI may be received from a PGW, and the core network node may be a SGW, and the core network node may be further operative to forward, to a mobility management node, the updated DTCI.

With respect to the core network node of this exemplifying embodiment, the management of the PDN connect may further comprise the core network node being operative to: delete the PDN connection if the DTCI indicates the PDN connection is delay tolerant; or maintain the PDN connection if the DTCI indicates the PDN connection is not delay tolerant.

According to such example embodiments, the updated DTCI may be provided from the PGW to the SGW in an Update/Create/Delete Bearer Request message.

With respect to the core network node of this exemplifying embodiment, the updated DTCI may be received from a SGW, and the core network node may be a mobility management node.

With respect to the core network node of this exemplifying embodiment, the mobility management node may be a Mobility Management Entity (115), a Serving General packet radio service Support Node, SGSN (111), or a S4-SGSN (110).

Some other embodiments describe above may be summarized in the following manner:

One other embodiment is directed to a method, in PCRF for dynamically managing a PDN connection for a wireless device. The method may comprise: detecting a status change in a delay tolerance of the PDN connection, wherein the status change presents a change with respect to if the identified PDN connection for the wireless device is capable of receiving delayed communications; updating a DTCI based on the detected status change; and sending, to a PGW, the updated DTCI.

Some other embodiments describe above may be summarized in the following manner:

One other embodiment is directed to a PCRF for dynamically managing a PDN, connection for a wireless device. The PCRF may comprise a processor and a memory, said memory comprising instructions executable by said processor whereby said PCRF is operative to: detect a status change in a delay tolerance of the PDN connection, wherein the status change presents a change with respect to if the identified PDN connection for the wireless device is capable of receiving delayed communications; update a DTCI, based on the detected status change; and send, to a PGW, the updated DTCI.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access. Furthermore, it should be appreciated that the term M2M device shall be interpreted as a sub-class of user equipment which engage in infrequent communications.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following summary of example embodiments.

The invention claimed is:

1. A method, in a Serving Gateway, SGW, for managing a Packet Data Network, PDN, connection for a wireless device, the method comprising:
  receiving a Delay Tolerance Connection Indicator, DTCI, from at least one General packet radio service Tunnelling Protocol, GTP, entity, during a mobility procedure with a SGW relocation, wherein the SGW is a new SGW and the DTCI indicates if communications on an identified PDN connection towards the wireless device can be delayed;
  storing the DTCI within the SGW; and
  upon detection of a failure of a mobility management node serving the wireless device, managing the PDN connection, wherein the managing comprises:
    deleting the PDN connection if the DTCI indicates the PDN connection is delay tolerant; or
    maintaining the PDN connection if the DTCI indicates the PDN connection is not delay tolerant.

2. The method of claim 1, wherein the at least one GTP entity is a PDN Gateway, PGW, and the receiving further comprises receiving, from the PGW, the DTCI during a PDN connection creation procedure.

3. The method of claim 1, wherein the at least one GTP entity is the new mobility management node which will serve the wireless device upon completion of the mobility procedure, the receiving further comprises receiving, from the new mobility management node, the DTCI during mobility procedure.

4. The method of claim 1, wherein the at least one GTP entity is a PGW, the receiving comprises receiving, from the PGW, a modify bearer response that includes the DTCI during mobility procedure.

5. The method of claim 1, further comprising receiving a dynamically updated DTCI from the at least one GTP entity.

6. The method of claim 1, wherein the mobility management node is a Mobility Management Entity, a Serving General packet radio service Support Node, SGSN, or a S4-SGSN.

7. A Serving Gateway, SGW, for managing a Packet Data Network, PDN, connection for a wireless device in a network triggered service restoration procedure, the SGW comprising a processor and a memory, said memory comprising instructions executable by said processor whereby said SGW is operative to:
  receive a modify bearer response, from at least one General packet radio service Tunnelling Protocol, GTP, entity, during a mobility procedure with a SGW relocation, wherein the SGW is a new SGW and the modify bearer response comprises a Delay Tolerance Connection Indicator, DTCI, indicating if communications on an identified PDN connection towards the wireless device can be delayed;
  store the DTCI within the SGW; and
  upon detection of a failure of a mobility management node serving the wireless device, manage the PDN connection, wherein the management comprises
    delete the PDN connection if the DTCI indicates the PDN connection is delay tolerant; or
    maintain the PDN connection if the DTCI indicates the PDN connection is not delay tolerant.

8. The SGW of claim 7, wherein the at least one GTP entity is a PDN Gateway, PGW, the SGW is further operative to receive, from the PGW, the DTCI during a PDN connection creation procedure.

9. The SGW of claim 7, wherein the at least one GTP entity is a new mobility management node, which will serve the wireless device upon completion of the mobility procedure, the SGW is further operative to receive, from the new mobility management node, the DTCI during mobility procedure.

10. The SGW of claim 7, wherein the at least one GTP entity is a PGW, the SGW is further operative to receive, from the PGW, the DTCI during mobility procedure.

11. The SGW of claim 7, the SGW is further operative to receive a dynamically updated DTCI from the at least one GTP entity.

12. The SGW of claim 7, wherein the mobility management node is a Mobility Management Entity, a Serving General packet radio service Support Node, SGSN, or a S4-SGSN.

* * * * *

UNITED STATES PATENT AND TRADEMARK OFFICE
CERTIFICATE OF CORRECTION

PATENT NO. : 10,735,952 B2
APPLICATION NO. : 15/746045
DATED : August 4, 2020
INVENTOR(S) : Yong Yang Page 1 of 1

It is certified that error appears in the above-identified patent and that said Letters Patent is hereby corrected as shown below:

On the Title Page

On Page 2, in item (56), under "OTHER PUBLICATIONS", in Column 1, Line 7, delete "Specfication" and insert -- Specification --, therefor.

On Page 2, in item (56), under "OTHER PUBLICATIONS", in Column 2, Line 43, delete "Dualcomm" and insert -- Qualcomm --, therefor.

In the Specification

In Column 4, Line 54, delete "is message" and insert -- is a message --, therefor.

In Column 4, Line 58, delete "is message" and insert -- is a message --, therefor.

Signed and Sealed this
Twenty-ninth Day of December, 2020

Andrei Iancu
*Director of the United States Patent and Trademark Office*